United States Patent
Wang et al.

(10) Patent No.: US 9,830,028 B2
(45) Date of Patent: Nov. 28, 2017

(54) IN-CELL TOUCH PANEL WITH SELF-CAPACITIVE ELECTRODES AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Yingming Liu, Beijing (CN); Xiaoliang Ding, Beijing (CN); Shengji Yang, Beijing (CN); Weijie Zhao, Beijing (CN); Hongjuan Liu, Beijing (CN); Tao Ren, Beijing (CN); Chunlei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 14/436,810

(22) PCT Filed: Aug. 15, 2014

(86) PCT No.: PCT/CN2014/084550
§ 371 (c)(1),
(2) Date: Apr. 17, 2015

(87) PCT Pub. No.: WO2015/135289
PCT Pub. Date: Sep. 17, 2015

(65) Prior Publication Data
US 2016/0188031 A1 Jun. 30, 2016

(30) Foreign Application Priority Data
Mar. 12, 2014 (CN) .......................... 2014 1 0090141

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ........................................ G06F 1/1684–1/1698
See application file for complete search history.

(56) References Cited

U.S. PATENT DOCUMENTS

2012/0105347 A1 5/2012 Pak
2013/0127747 A1* 5/2013 Ding ..................... G06F 3/0412
345/173

(Continued)

FOREIGN PATENT DOCUMENTS

| CN | 103294322 A | 9/2010 |
| CN | 103279244 A | 9/2013 |

(Continued)

OTHER PUBLICATIONS

International Search Report Appln. No. PC/CN2014/084550; dated Dec. 23, 2014.

(Continued)

*Primary Examiner* — Sanghyuk Park
(74) *Attorney, Agent, or Firm* — Ladas & Parry LLP

(57) ABSTRACT

An in-cell touch panel and a display device are disclosed. The touch panel comprises: an upper substrate (01) and a lower substrate (02) that are disposed opposite to each other, with a planarization layer (09) and a spacer layer (10), which is disposed on the planarization layer (09), provided at a side, facing the lower substrate (02), of the upper substrate (01); and a plurality of self-capacitive electrodes (04) disposed in a same layer, insulated from each other and arranged between the planarization layer (09) and the spacer (Continued)

layer (10). In the touch panel, the self-capacitive electrodes (04) are arranged between the planarization layer (09) and the spacer layer (10) of the upper substrate (01), and thus patterning process for the planarization layer (09) can be omitted so as to reduce the manufacturing processes.

13 Claims, 9 Drawing Sheets

(56) References Cited

U.S. PATENT DOCUMENTS

| | | | |
|---|---|---|---|
| 2013/0328829 A1* | 12/2013 | Lee | G06F 3/0412 345/174 |
| 2014/0362028 A1 | 12/2014 | Mo et al. | |
| 2014/0362029 A1 | 12/2014 | Mo et al. | |
| 2015/0177879 A1* | 6/2015 | Misaki | H05K 1/0306 345/174 |

FOREIGN PATENT DOCUMENTS

| | | |
|---|---|---|
| CN | 103885660 A | 6/2014 |
| KR | 20120017755 A | 2/2012 |

OTHER PUBLICATIONS

Written Opinion of the International Searching Authority Appln. No. PCT/CN2014/084550; dated Dec. 23, 2014.
First Chinese Office Action Appln. No. 201410090141.7; dated Jun. 11, 2015.
First Chinese Office Action Appln. No. 2011410090141.7; dated Jun. 11, 2015.
Second Chinese Office Action Appln. No. 201410090141.7; dated Nov. 16, 2015.
Chinese Notice of Allowance Appln. No. 201410090141.7; dated Mar. 9, 2016.

* cited by examiner

IN-CELL TOUCH PANEL WITH SELF-CAPACITIVE ELECTRODES AND DISPLAY DEVICE

TECHNICAL FIELD

At least one embodiment of the present disclosure relates to an in-cell touch panel and a display device.

BACKGROUND

With the rapid development of display technologies, touch panels (touch screen panels) have already spread all over people's lives. At present, touch panels can be classified into an add-on mode touch panel, an on-cell touch panel and an in-cell touch panel according to formed structures. For the add-on mode touch panel, a touch panel and a liquid crystal display (LCD) are produced separately, and then are attached together to form a liquid crystal display panel having a touch function. The add-on mode touch panel has disadvantages such as a higher production cost, a lower light transmittance and a thicker module. For an in-cell touch panel, touch electrodes of a touch panel are embedded inside a liquid crystal display panel, so that the overall thickness of the module can be thinned, and the production cost of the touch panel can be reduced greatly as well, and thus it becomes attractive to the major panel manufacturers.

At present, a capacitive in-cell touch panel is implemented by adding touch driving electrodes and touch sensing electrodes to a TFT (thin film transistor) array substrate directly and additionally. That is, two layers of strip-like ITO electrodes that are non-uniplanar and intersect each other are produced on a surface of the TFT array substrate, and these two layers of ITO (Indium Tin Oxides) electrodes act as touch driving electrodes and touch sensing electrodes of the touch panel, respectively. As illustrated in FIG. 1, a mutual capacitance Cm is produced between a touch driving electrode Tx that is transversely arranged and a touch sensing electrode Rx that is longitudinally arranged. When a finger touches the panel, value of the mutual capacitance Cm can be changed by the touch of the finger, and a touch detection device detects the position of a touch point of the finger by detecting the variation of the currents respectively corresponding to the capacitances Cm before and after the finger's touch.

Two kinds of mutual capacitances Cm can be formed between a touch driving electrode Tx that is transversely arranged and a touch sensing electrode Rx that is longitudinally arranged. As shown in FIG. 1, one is the projective capacitance that is effective for achieving a touch function (curves with arrowheads in FIG. 1 denote the projective capacitance), and when a finger touches the panel, the value of the projective capacitance can be changed; and the other one is the facing capacitance that is unuseful for achieving a touch function (straight lines with arrowheads denote the facing capacitance), and when a finger touches the panel, the value of the facing capacitance can not be changed.

SUMMARY

At least one embodiment of the disclosure provides an in-cell touch panel and a display device, for achieving such an in-cell touch panel that has higher touch precision, lower cost, higher production efficiency and higher transmittance.

An in-cell touch panel, which is provided by at least one embodiment of the disclosure, includes: an upper substrate and a lower substrate that are disposed opposite to each other, with a planarization layer and a spacer layer, which is disposed on the planarization layer, provided at a side, facing the lower substrate, of the upper substrate; and a plurality of self-capacitive electrodes disposed in a same layer, insulated from each other and arranged between the planarization layer and the spacer layer.

A display device, which is provided by at least one embodiment of the disclosure, includes the above-mentioned in-cell touch panel provided by the embodiment of the disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The thicknesses and shapes of all the thin films in the accompanying drawings do not reflect the real scale, the objective of which is merely to schematically describe the embodiments of the present disclosure.

Figure 1:
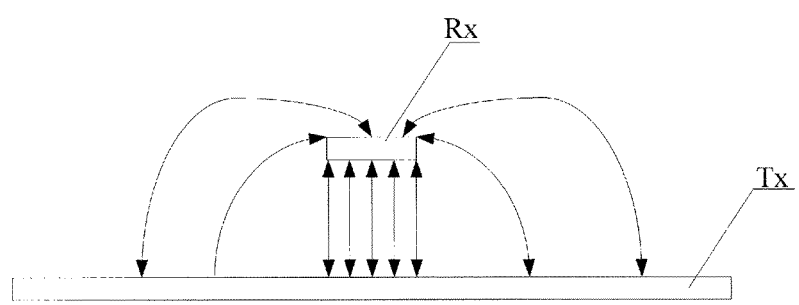
FIG. 1 is a schematic view illustrating capacitances produced between a touch driving electrode and a touch sensing electrode.

The inventor of the present application noted that, in the structural design of a capacitive in-cell touch panel illustrated in FIG. 1, a human body capacitance can couple merely with the projective capacitance between mutual capacitances, and the facing capacitance formed at a position where a touch driving electrode faces a touch sensing electrode can reduce the signal to noise ratio of the touch panel, and this affects the touch sensing accuracy of the in-cell touch panel. Moreover, it is necessary for the above structure to add two film layers on a TFT array substrate, and this causes a new process to be added when the TFT array substrate is manufactured, increases the production cost, and is not conductive to the improvement of the production efficiency.

Figure 2:
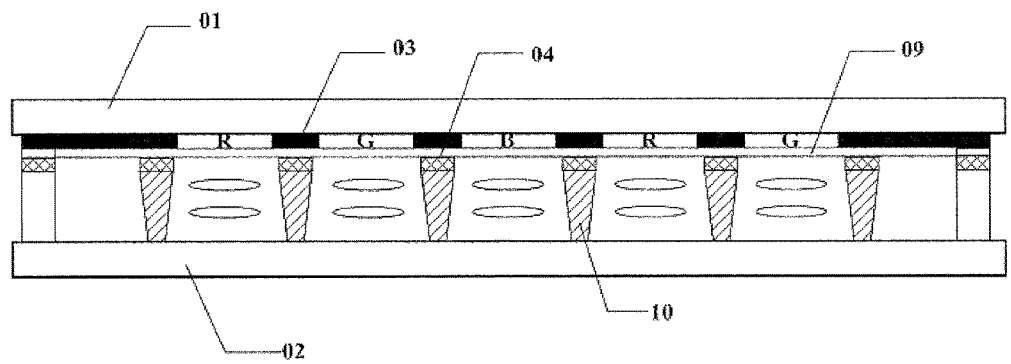
FIG. 2 is a structurally schematic view illustrating an in-cell touch panel provided by an embodiment of the disclosure.

An in-cell touch panel provided by at least one embodiment of the present disclosure, as illustrated in FIG. 2, includes an upper substrate 01 and a lower substrate 02 disposed opposite to each other, with a planarization layer 09 and a spacer layer 10, which is disposed on the planarization layer, provided at a side, facing the lower substrate 02, of the upper substrate 01; and a plurality of self-capacitive electrodes 04 disposed in a same layer, insulated from each other and arranged between the planarization layer 09 and the spacer layer 10. In one embodiment, the in-cell touch panel further includes a touch detection chip configured to judge a touch location by means of detecting the variation of capacitance value of each self-capacitive electrode in a touch period.

In the above-mentioned in-cell touch panel provided by embodiments of the disclosure, a plurality of self-capacitive electrodes 04 disposed in a same layer and insulated from each other are arranged on the upper substrate 01 of the touch panel by using the principle of self capacitance; when a human body does not touch the panel, the capacitance applied to each self-capacitive electrode 04 is a fixed value; when a human body contacts the panel, the capacitive applied to a corresponding self-capacitive electrode 04 is the fixed value plus the body capacitance; and the touch detection chip can determine the touch location by detecting the change of capacitance value of each self-capacitive electrode 04 in a touch period. The body capacitance can act on all self capacitances, as compared with the mode in which the body capacitance can merely act on the projective capacitance in mutual capacitances, so the amount of touch change caused by the touch of a human body on the panel can be larger, and the signal to noise ratio of touch can be effectively raised. Thus, the touch sensing accuracy is enhanced.

As compared with the case where a planarization layer needs to be patterned when self-capacitive electrodes are arranged between an upper substrate and the planarization layer so as to expose conduction nodes disposed in a same layer as the self-capacitive electrodes, and the conduction nodes are respectively and electrically connected to connection terminals of a touch detection chip located on a lower substrate through a sealant, because self-capacitive electrodes are arranged between a planarization layer and a spacer layer of an upper substrate in the touch panel provided by embodiments of the disclosure, patterning process for the planarization layer can be omitted, and conduction nodes disposed in a same layer as the self-capacitive electrodes can be electrically connected to connection terminals of the touch detection chip located on a lower substrate directly through a sealant. This cuts down the manufacturing processes.

In one embodiment, in order that the change of capacitance value of each self-capacitive electrode 04 can be effectively detected, the touch detection chip can apply a driving signal to each self-capacitive electrode 04 in a touch period, and receive a feedback signal from each self-capacitive electrode 04. The RC delay of a feedback signal can be increased by the change of capacitance value induced by touching a self-capacitive electrode 04, so by means of judging the RC delay of a feedback signal of each self-capacitive electrode 04, whether or not the self-capacitive electrode 04 is touched can be determined. Thereby, the touch location is positioned. Of course, the touch detection chip can also determine the change of capacitance value of each self-capacitive electrode 04 through other manners, such as detecting the change amount of charge, so as to judge the touch location, and detailed descriptions are omitted herein.

In one embodiment, in order to reduce the mutual the interference between a display signal and a touch signal, and to improve the picture quality and the touch accuracy, in the above touch panel provided by embodiments of the disclosure, a time-division driving mode can also be adopted at touch and display stages. Furthermore, in one embodiment, a display driving chip and a touch detection chip can also be integrated into one chip, so as to further reduce the production cost.

Figure 3:
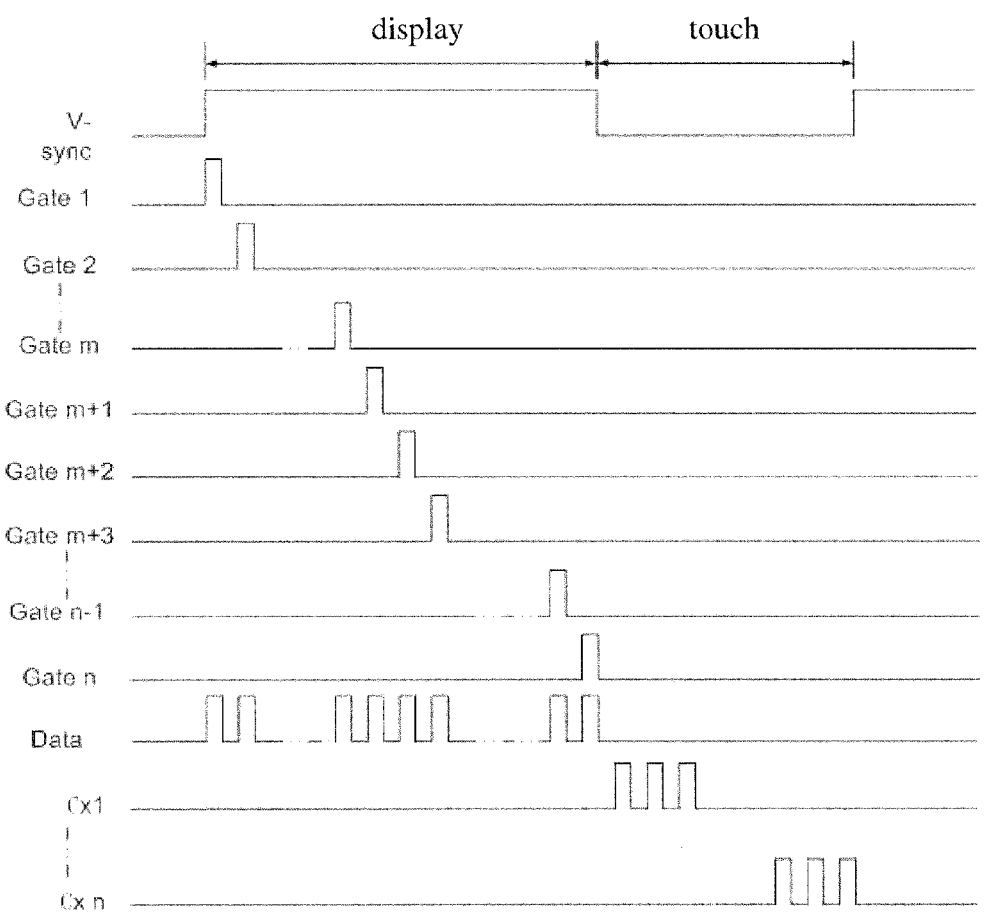
FIG. 3 is a schematic diagram illustrating a drive time sequence of an in-cell touch panel provided by an embodiment of the disclosure.

In one embodiment, for example, in the drive timing sequence diagram illustrated in FIG. 3, the time-period that the touch panel displays each frame (V-sync) is divided into a display time period (display) and a touch time period (touch). For example, in the drive timing sequence illustrated in FIG. 3, the time-period that the touch panel displays one frame is 16.7 ms, 5 ms of which is selected as the touch time period, and the remaining 11.7 ms serves as the display time period. Certainly, time-periods of the two can also be appropriately adjusted according to the processing capacity of an IC (Integrated Circuit) chip as well, and embodiments of the disclosure are not limited thereto. In a display time period (display), gate scanning signals are sequentially applied to respective gate signal lines Gate1, Gate2, . . . , Gate n in the touch panel, a gray-scale signal is applied to each data signal line, so as to achieve a liquid crystal display function. In a touch time period (touch), a touch detection chip connected to self-capacitive electrodes Cx1, . . . , Cx n applies driving signals respectively to touch driving electrodes Cx1, . . . , Cx n, and meanwhile receives feedback signals of the self-capacitive electrodes Cx1, . . . , Cx n. Whether or not a touch occurs is judged by analyzing the feedback signals, so as to achieve a touch function.

In the above-mentioned in-cell touch panel provided by embodiments of the disclosure, self-capacitive electrodes 04 disposed on the upper substrate 01 can be provided in a same layer. Therefore, as compared with the mode in which two film layers need to be provided within an array substrate upon realization of a touch function by using the principle of mutual capacitance, in the touch panel provided by embodiments of the disclosure, only one layer of self-capacitive electrodes 04 is required to be provided for realization of the touch function. This saves the production cost, and enhances the production efficiency.

In one embodiment, as illustrated in FIG. 2, the above-mentioned in-cell touch panel provided by embodiments of the disclosure can further include a black matrix layer 03 disposed between the upper substrate 01 and the lower substrate 02. The orthographic projection of the pattern of each self-capacitive electrode 04 on the lower substrate 02 can be located within the region corresponding to the pattern of the black matrix layer 03.

In the embodiment, because the pattern of each self-capacitive electrode 04 is arranged in the region where the pattern of the black matrix layer 03 is located, an electric field generated by self-capacitive electrodes can not affect an electric field in an opening region of a pixel, and thus can not affect the normal display. Furthermore, by disposing each self-capacitive electrode disposed in the sheltering region of the pattern of the black matrix layer 03, it is also possible to avoid the self-capacitive electrode 04 from affecting the transmittance of the touch panel.

Figure 4:
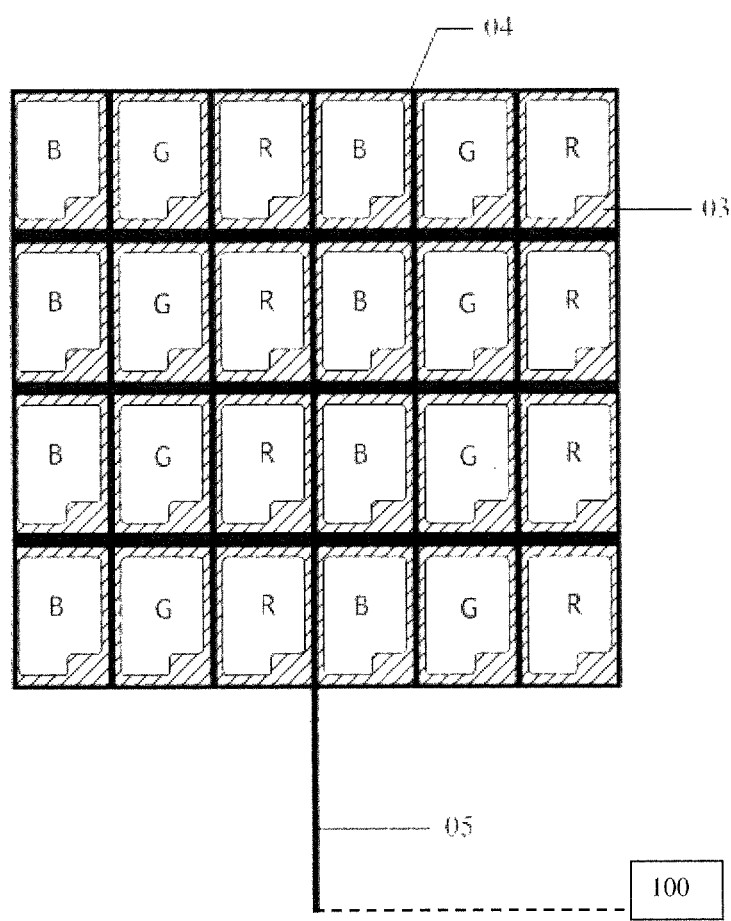
FIG. 4 is a structurally schematic view illustrating one self-capacitive electrode in an in-cell touch panel provided by an embodiment of the disclosure.

The density of a touch panel is generally on the order of millimeters, and thus, in one embodiment, the density and occupied area of the self-capacitive electrodes 04 can be selected according to the required touch density so as to ensure the required touch density. In general, each self-capacitive electrode 04 is designed to be a square electrode of about 5 mm×5 mm. The density of a display panel is usually on the order of microns, and therefore, one self-capacitive electrode 04 can generally correspond to a plurality of pixel units in the display panel. In order that the pattern of each self-capacitive electrode 04 does not occupy the opening region of a pixel unit, as illustrated in FIG. 4, in one embodiment, a pattern, at a position corresponding to an opening region of a pixel unit (a blank part in the pixel region), in the pattern of each self-capacitive electrode 04 can be removed away. That is, the pattern of each self-capacitive electrode 04 can be designed in such a manner that the orthographic projection on the lower substrate 02 is of a mesh structure located within the region corresponding to the pattern of the black matrix layer 03. In one embodiment, in order to guarantee the uniformity of display, the pattern of each self-capacitive electrode 04 is usually arranged at the gaps between sub-pixel units in each pixel unit. In FIG. 4, each group of RGB sub-pixel units forms one pixel unit. The density mentioned in embodiments of the disclosure refers to a pitch between self-capacitive electrodes of the touch panel or a pitch between pixel units of the display panel.

Figure 5A:
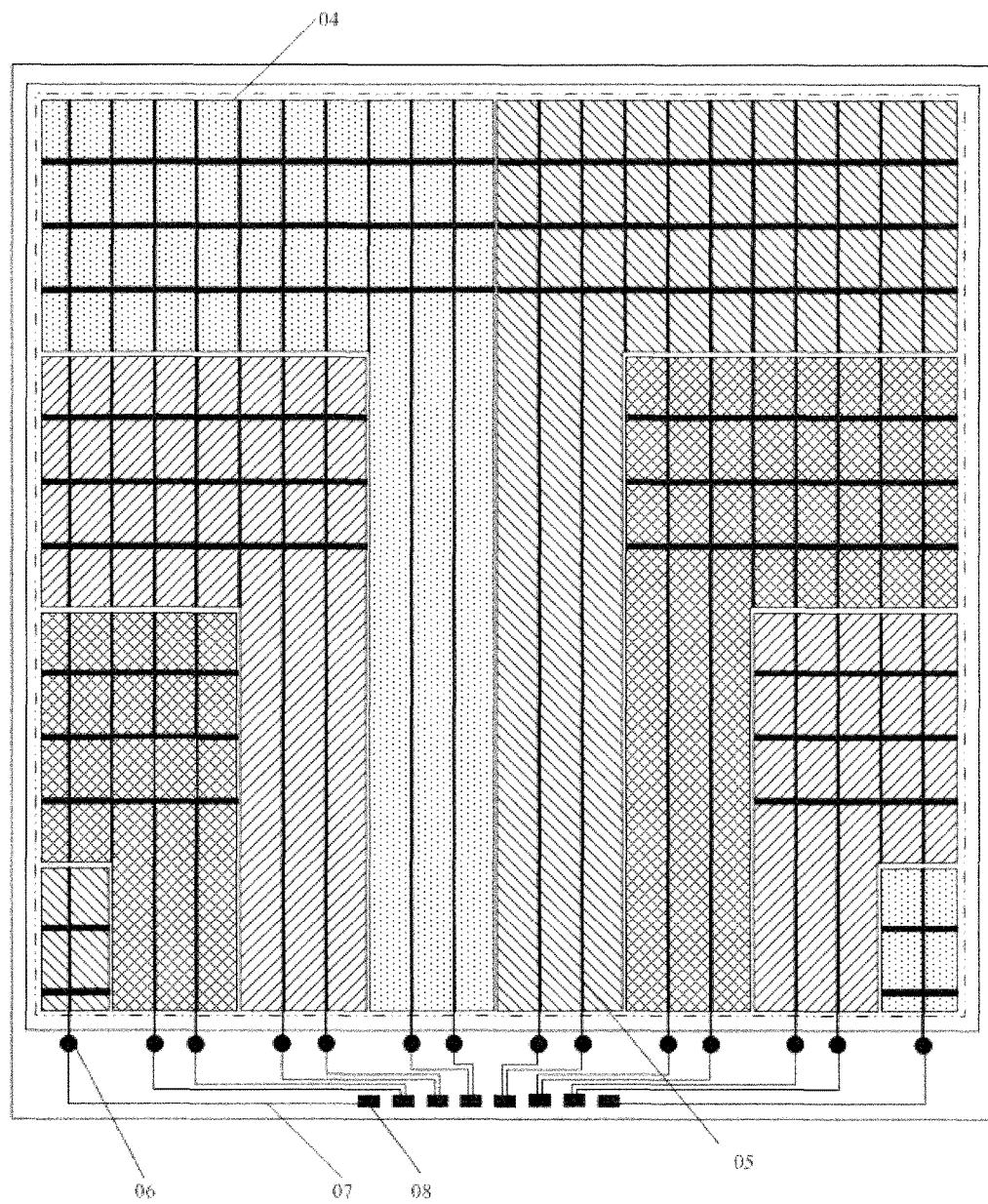
FIG. 5a is a schematic view illustrating that conductive wires and self-capacitive electrodes are disposed in a same layer by adopting a wiring mode in an in-cell touch panel provided by an embodiment of the disclosure.

In order to facilitate the touch detection chip to detect the change of capacitance value of each self-capacitive electrode, the above-mentioned in-cell touch panel provided by one embodiment of the disclosure, as illustrated in FIG. 5a, can further include conductive wires 05 corresponding to the self-capacitive electrodes 04 in a one-to-one manner, and conduction nodes 06 corresponding to the self-capacitive electrodes 04 in a one-to-one manner. Each conduction node 06 can be provided in the region where a sealant of the in-cell touch panel is provided. And in order not to affect the normal display function, the orthographic projection of each wire 05 on the lower substrate 02 can also be situated within the region corresponding to the pattern of the black matrix layer 03. Each self-capacitive electrode 04 is electrically connected to a connection terminal 08 of the touch detection chip through a leading wire 07 situated in the region where the sealant is provided, after the self-capacitive electrode is connected to a conduction node 06 through a conductive wire 05. The case that eight self-capacitive electrodes 04 are provided in one row is illustrated in FIG. 5a. The number of the conductive wires 05 that correspond to the self-capacitive electrodes 04 in a one-to-one manner and the number of the conduction nodes 06 that correspond to the self-capacitive electrodes 04 in a one-to-one manner can be one, or can also be more than one, and embodiments are not limited thereto. As illustrated in FIG. 4, a conductive wire 05 is connected to the touch detection chip 100, and for example, the touch detection chip 100 can be arranged on one substrate or arranged on a flexible printed circuit board.

Figure 5B:
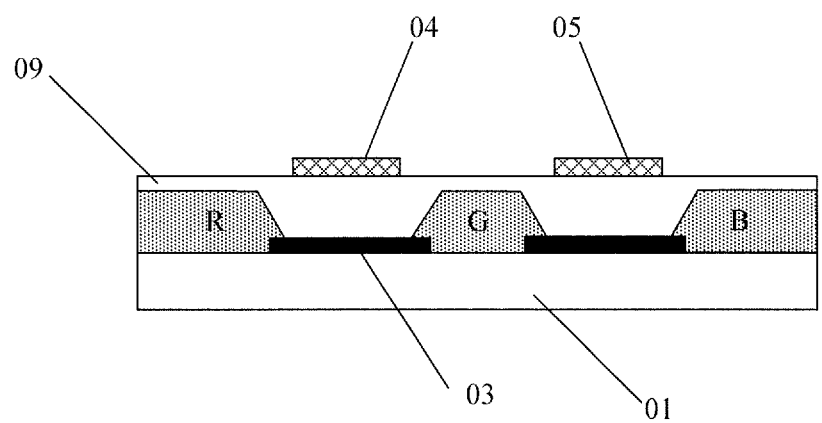
FIG. 5b is a schematic view illustrating that conductive wires and self-capacitive electrodes are provided in a same layer in an in-cell touch panel provided by an embodiment of the disclosure.

In one embodiment, conductive wires 05 and conduction nodes 06 can be provided on the upper substrate 01 together with self-capacitive electrodes 04; and leading wires 07 and connection terminals 08 of the touch detection chip can be provided on the lower substrate 02. In one embodiment, in order to decrease the number of film layers and the patterning processes as much as possible, the conductive wires 05 and the self-capacitive electrodes 04 can be disposed in a same layer. As illustrated in FIG. 5b, a conductive wire 05 and a self-capacitive electrode 04 are arranged between a planarization layer 09 and a spacer layer 10 of an upper substrate 01. However, in view of the fact that the patterns of the self-capacitive electrodes 04 and the patterns of conductive wires 05 are designed by using one metal layer, in order to obviate a short-circuit phenomenon from happening between the self-capacitive electrodes 04, it is necessary that the conductive wires 05 for respectively connecting the self-capacitive electrodes 04 do not intersect each other. Thus, when the leading wires 05 are designed by adopting the wiring manner illustrated in FIG. 5a, the conductive wires 05 respectively connected to all of the self-capacitive electrodes 04 extend along one direction, and are connected to respective conduction nodes 06 that are disposed within the same side region. This can cause a lot of touch blind zones to occur in the touch panel. FIG. 5a shows touch blind zones formed by eight self-capacitive electrodes 04 in one row; only the patterns of the self-capacitive electrodes 04 and the patterns of the conductive wires 05 connected to the self-capacitive electrodes 04 are illustrated in FIG. 5a, and the patterns of sub-pixel units are not illustrated; and for the convenience of observing, areas respectively occupied by the self-capacitive electrodes 04 are illustrated in FIG. 5a with different filling patterns. Within a touch blind zone, all the conductive wires 05 for connecting a plurality of self-capacitive electrodes go through the touch blind zone, and thus signals within this touch blind zone are relatively disordered, so it is called as a touch blind zone, namely, the touch property within this zone can not be guaranteed.

In order to decrease the area of touch blind zones as much as possible, conduction nodes 06 can be distributed at each of four sides of the region where the sealant of the in-cell touch panel is provided. That is, the conduction nodes 06 demonstrate their own distribution at each of the four sides where a sealant is provided. In this way, by means of connecting the self-capacitive electrodes 04 to corresponding conduction nodes 06 disposed around a display region through the conductive wires 05, respectively, the area of touch blind zones can be decreased in the mass.

Figure 6:
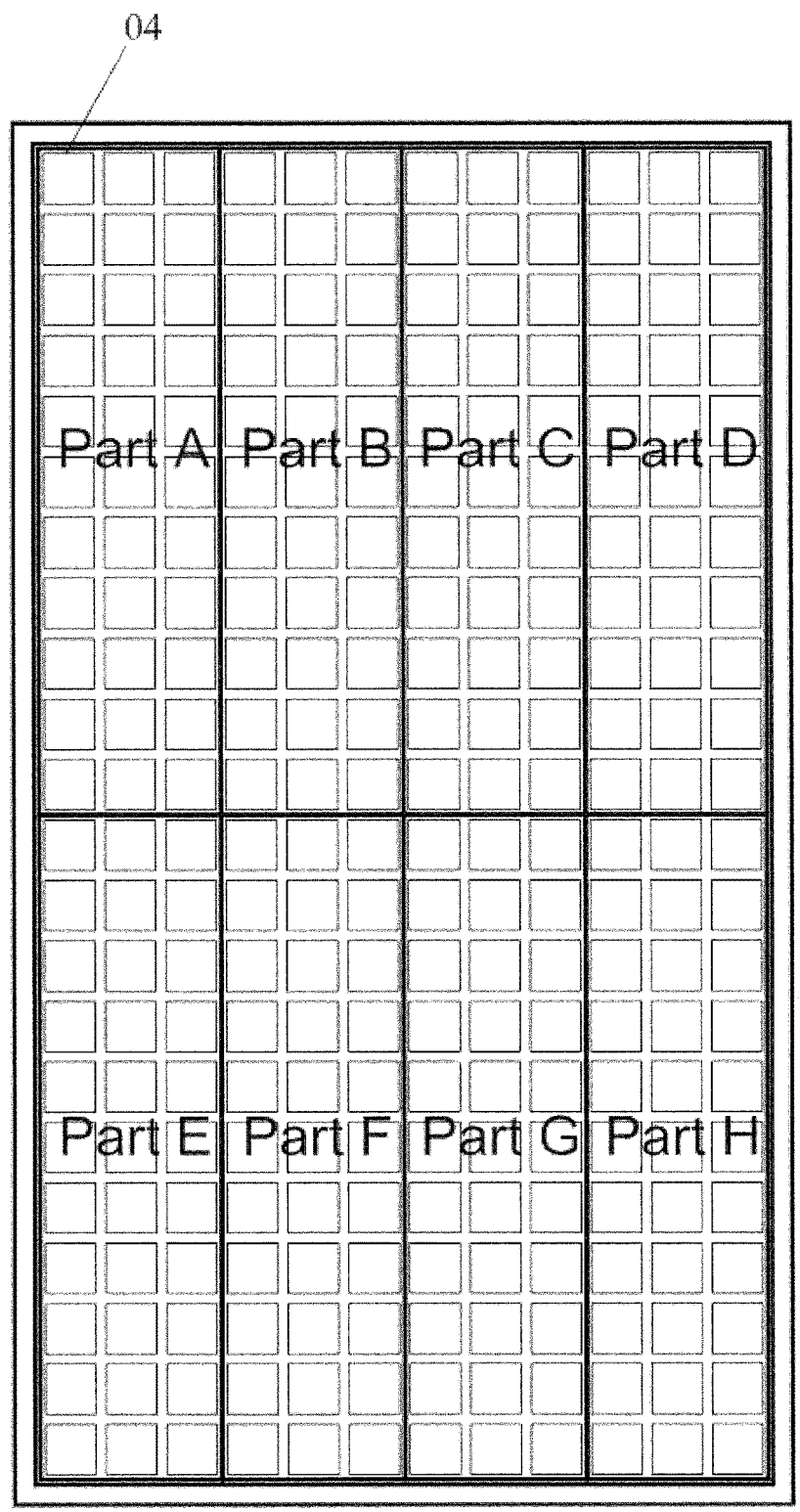
FIG. 6 is a schematic view illustrating a partition of self-capacitive electrodes in a display region in an in-cell touch panel provided by an embodiment of the disclosure.
Figure 7:
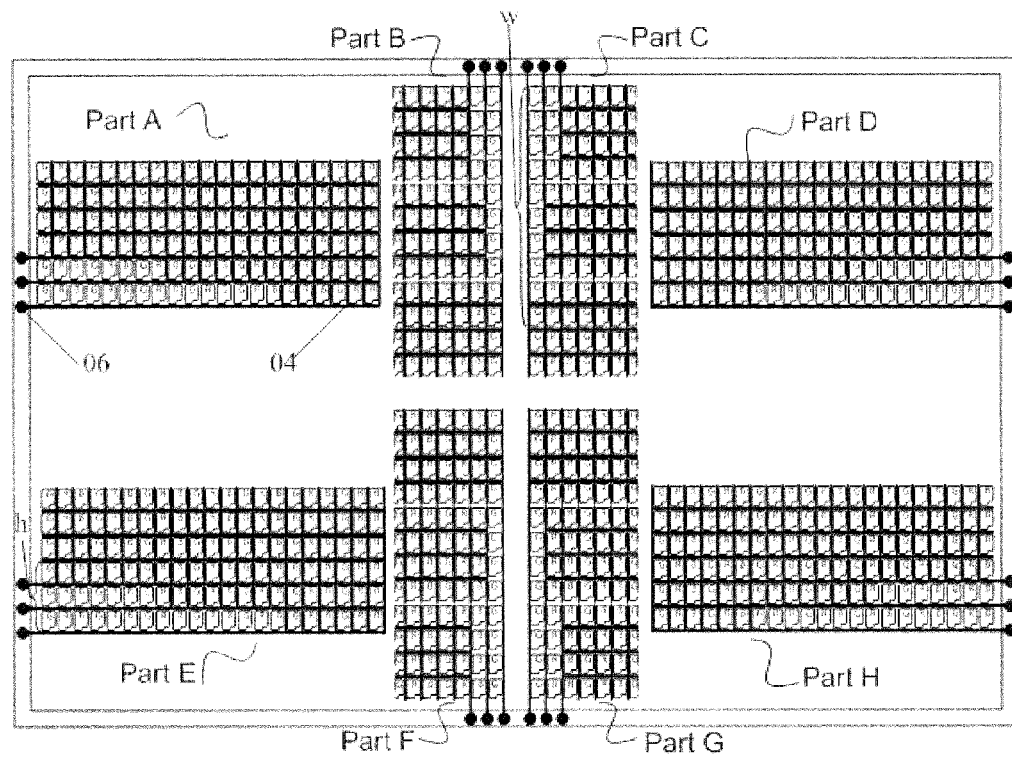
FIG. 7 is a schematic view illustrating a connection between conduction nodes and self-capacitive electrodes disposed in a same layer as the conduction nodes, within each zone in an in-cell touch panel provided by an embodiment of the disclosure.

The above-mentioned design used for decreasing the touch blind zones provided by embodiments of the disclosure can be described, taking a 5-inch touch panel as an example, and the number of self-capacitive electrodes 04 required in the 5-inch touch panel is about 22×12=264. As illustrated in FIG. 6, in order that each self-capacitive electrode 04 is led to a corresponding conduction node 06, and the area of touch blind zones is reduced as much as possible, all of self-capacitive electrodes 04 can be divided into eight zones denoted by Part A~Part H, and for each of the zones, the self-capacitive electrodes 04 within the zone are needed to be connected to connection terminals (FPC Bonding Pads) 08 of the touch detection chip underneath a display region (Panel) one by one. As illustrated in FIG. 7, three self-capacitive electrodes 04 are illustrated in each of the zones in FIG. 7, self-capacitive electrodes at a Part A zone are led out from an upper-left zone of the display region, and led to an FPC bonding region (Bonding Pad) after passing through a left border of the display region; self-capacitive electrodes at a Part B zone are led out from an upper side of the display region, and then led to the FPC bonding region after passing through the left border of the display region; self-capacitive electrodes at a C zone of the display region are led out from the upper side of the display region, and then led to the FPC bonding region after passing through a right border of the display region; self-capacitive electrodes at a Part D zone are led out from an upper-right side of the display region, and then led to the FPC bonding region through the right border of the display region. Likewise, self-capacitive electrodes at a Part E zone are led out from the bottom-left side of the display region, and led to the FPC bonding region through the left border of the display region; self-capacitive electrodes at a Part F zone are led out from a lower side of the display region, and then directly connected to the FPC bonding region; self-capacitive electrodes at a Part G zone are led out from the lower side of the display region, and then directly connected to the FPC bonding region; and self-capacitive electrodes at a Part H zone are led out from the bottom-right side of the display region, and led to the FPC bonding region through the right border of the display region.

In one embodiment, for the convenience of observing, FIG. 7 only shows the connecting relationship between a part of self-capacitive electrodes 04 and conduction nodes 06. It can be seen from FIG. 7, the size of the touch blind zone in each of Part A, Part D, Part E and Part H located on two sides of the display region is about the width of three sub-pixel units, and is denoted by h in FIG. 7, and when estimation is made with reference to the size of a corresponding pixel unit in a 5-inch touch panel, the touch blind zone is about 260 µm; and the size of a touch blind zone in each of Part B, Part C, Part F and Part G located in the center of the display region is about the width of ten sub-pixel units, and is denoted by w in FIG. 7, and when estimation is made with reference to the size of a corresponding pixel unit in a 5-inch touch panel, the touch blind zone is about 290 µm.

The above-mentioned connecting relationship between self-capacitive electrodes 04 and conduction nodes 06 is merely for the exemplary illustration, and it can be designed according to the specific size of a touch panel upon practical design. In order to decrease the area of touch blind zones as far as possible, in one embodiment, a conduction node 06, to which each self-capacitive electrode 04 correspond, can be distributed at a side, closest to the self-capacitive electrode 04, of the region where the sealant is provided. In this way, the length of the conductive wire 05 for connecting the self-capacitive electrode 04 and the conduction node 06 can be shortened as far as possible, so as to decrease the area of touch blind zones as far as possible.

Figure 8:
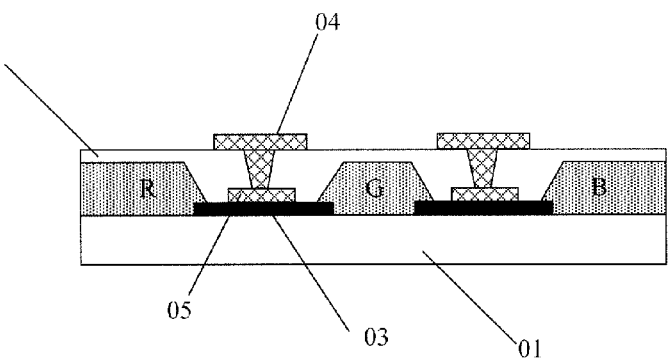
FIG. 8 is a schematic view illustrating that self-capacitive electrodes and conductive wires are provided in different layers in an in-cell touch panel provided by an embodiment of the disclosure.
Figure 9:
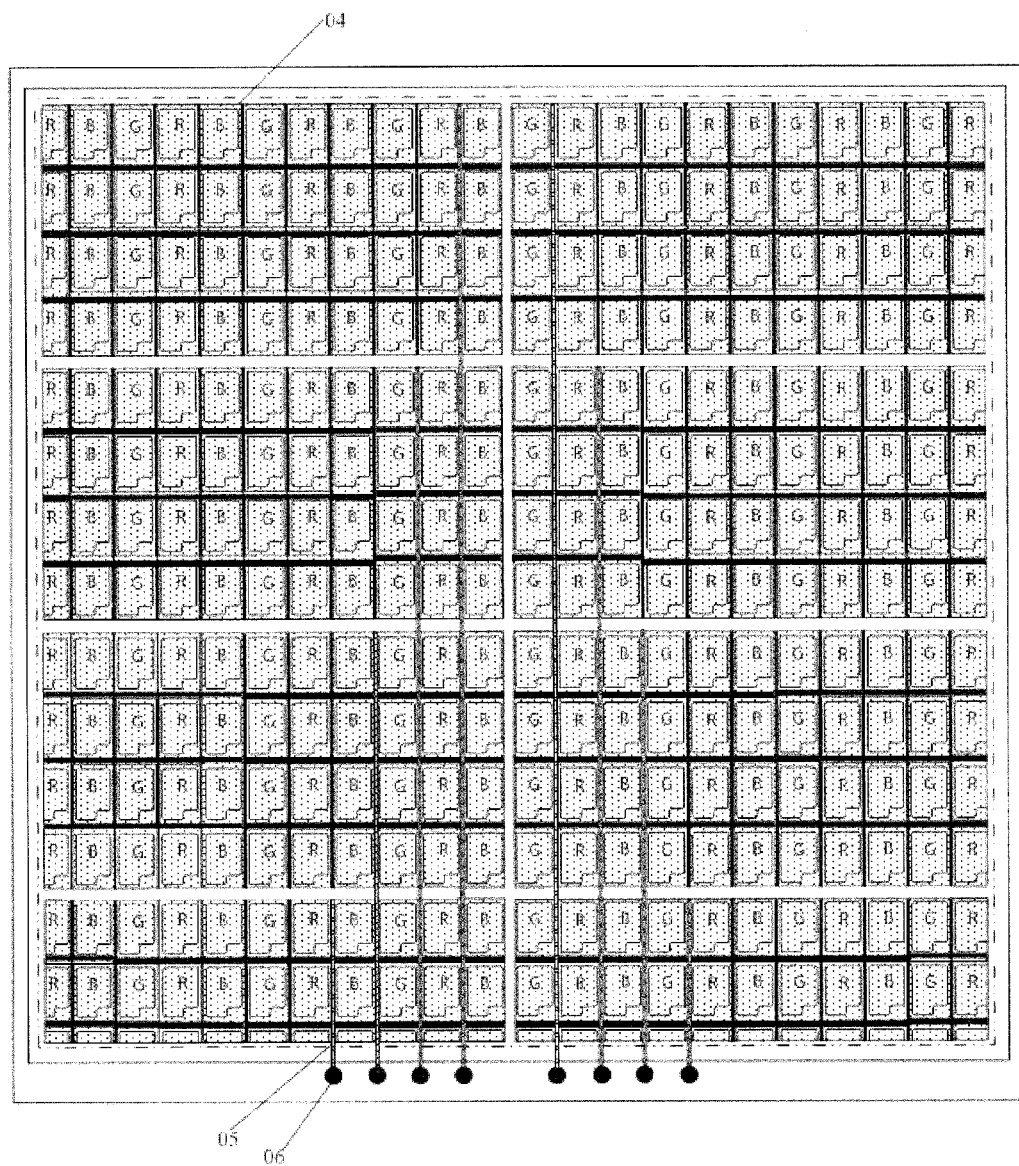
FIG. 9 is a schematic view illustrating a connection between conduction nodes and self-capacitive electrodes when the self-capacitive electrodes and conductive wires are disposed in different layers, in an in-cell touch panel provided by an embodiment of the disclosure.

In one embodiment, in order to eliminate touch blind zones appearing in the touch panel, it is possible that self-capacitive electrodes 04 and conductive wires 05 are disposed in different layers, and the conductive wires 05 are arranged between the upper substrate 01 and the planarization layer 09. For example, as illustrated in FIG. 8, it is possible that conductive wires 05 are disposed between the planarization layer 09 and a black matrix layer 03, and each of the self-capacitive electrodes 04 is electrically connected to a corresponding conductive wire 05 through a via hole. In this way, a wiring manner illustrated in FIG. 9 can be adopted upon designing the connecting relationship of conductive wires 05, and namely, all the conductive wires 05 respectively connected to all the self-capacitive electrodes 04 extend along one direction, and are connected to respective conduction nodes 06 arranged within the same side region of the region where the sealant is provided.

In one embodiment, in the in-cell touch panel provided by embodiments of the disclosure, the body capacitance acts on the self capacitance of each self-capacitive electrode 04 by way of directly coupling, and therefore, when a human body touches the panel, a greater variation merely happens to the capacitance value of a self-capacitive electrode 04 underneath the touch location, and the variation of the capacitance value of self-capacitive electrodes 04 adjacent to the self-capacitive electrode 04 underneath the touch location is very small. In this way, when a finger, as an example, slides on the touch panel, the case that touch coordinates within the region where self-capacitive electrodes 04 are located cannot be determined can occur. Therefore, in the above in-cell touch panel provided by embodiments of the disclosure, opposite sides, which respectively belong to two adjacent self-capacitive electrodes 04, each can be arranged to be a zigzag line, so as to increase the change of capacitance value of self-capacitance electrodes 04 adjacent to a self-capacitance electrode 04 underneath the touch location.

For example, the entire shape of each self-capacitive electrode 04 can be set in one of the following two manners or a combination thereof.

Figure 10A:
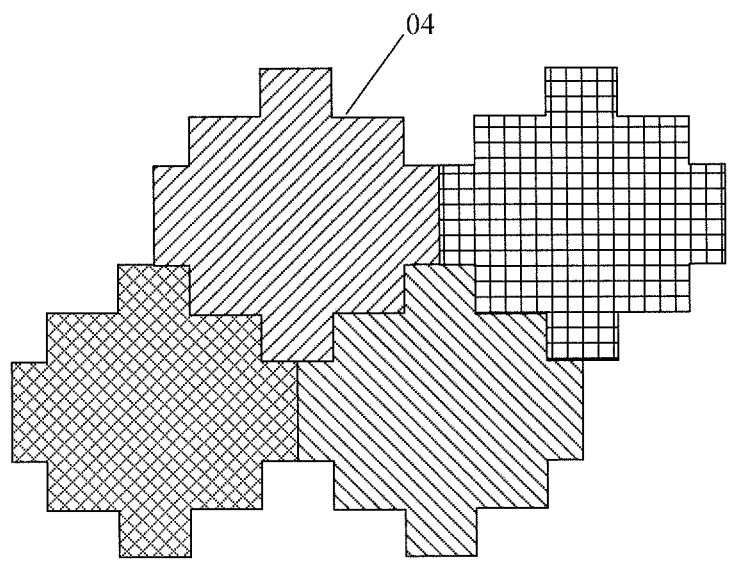
FIG. 10a and FIG. 10b are structurally schematic views each illustrating a case that opposite sides, which respectively belong to adjacent self-capacitive electrodes, is provided to be a zigzag line in an in-cell touch panel provided by an embodiment of the disclosure.

1: opposite sides, which respectively belong to two adjacent self-capacitive electrodes 04 and which each comprise a zigzag line, are respectively arranged to be of a stepped structure, and the two stepped structures are uniform in shape and match with each other, as illustrated in FIG. 10a which shows 2×2 self-capacitive electrodes 04.

Figure 10B:
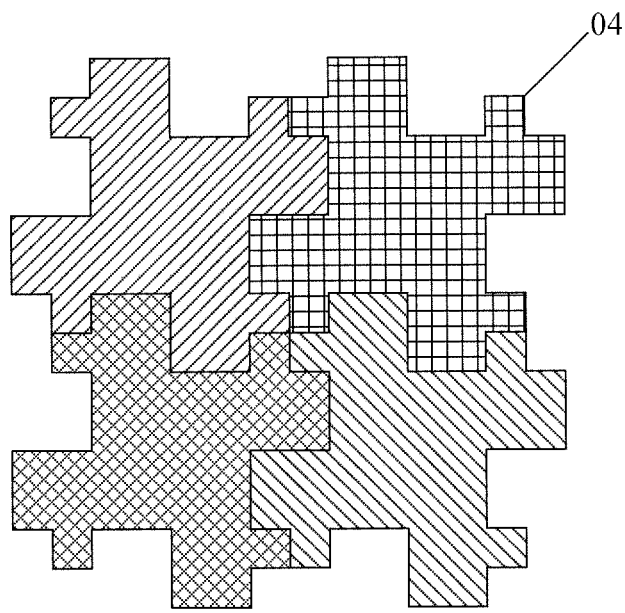

2: opposite sides, which respectively belong to two adjacent self-capacitive electrodes 04 and which each comprise a zigzag line, are respectively arranged to be of a concave-convex structure, and the two concave-convex structures are uniform in shape and match with each other, as illustrated in FIG. 10b which shows 2×2 self-capacitive electrodes 04.

Base on the same inventive concept, at least one embodiment of the present disclosure provides a display device, which includes the above in-cell touch panel provided by any one of embodiments of the disclosure. The display device can be a cell phone, a tablet computer, a television, a display, a notebook computer, a digital photo frame, a navigator or any other product or component having a display function. Implementation of the display device can be referred to the implementation of the above in-cell touch panel, and repetitions are omitted herein.

In the in-cell touch panel and display device provided by embodiments of the disclosure, a plurality of self-capacitive electrodes disposed in a same layer and insulated from each other are arranged on an upper substrate of the touch panel by using the principle of self capacitance; when a human body does not touch the panel, the capacitance applied to each self-capacitive electrode is a fixed value; when a human body touches the panel, the capacitive applied to a corresponding self-capacitive electrode is the fixed value plus the body capacitance; and a touch detection chip can judge the touch location by detecting the change of capacitance value of each self-capacitive electrode in a touch period. In view of the fact that the body capacitance can act on all the self capacitance, as compared with the mode in which the body capacitance can merely act on the projective capacitance of a mutual capacitance, the amount of touch change caused due to that a human body touches the panel can be larger, so the signal to noise ratio of touch can be effectively raised. Thus, the touch sensing accuracy is enhanced. Furthermore, as compared with the mode in which two film layers need to be provided within an array substrate upon realization of a touch function by using the principle of mutual capacitance, in the touch panel provided by embodiments of the disclosure, only one layer of self-capacitive electrodes is required to be provided for the realization of the touch function, and this saves the production cost, and enhances the production efficiency.

As compared to the case where a planarization layer needs to be patterned when self-capacitive electrodes are arranged between an upper substrate and the planarization layer, so as to expose conduction nodes disposed in a same layer as the self-capacitive electrodes and the conduction nodes are respectively and electrically connected to connection terminals of a touch detection chip located on a lower substrate through a sealant, in the touch panel provided by embodiments of the disclosure, owing to self-capacitive electrodes arranged between a planarization layer and a spacer layer of an upper substrate, the patterning process for the planarization layer can be omitted, and conduction nodes disposed in a same layer as the self-capacitive electrodes can be respectively and electrically connected to connection terminals of a touch detection chip located on a lower substrate directly through a sealant. This reduces the manufacturing processes.

It is apparent to those skilled in the art to make various modifications and variations to the present disclosure without departing from the spirit and scope of the present disclosure. In this way, if these modifications and variations belong to the scope of the claims of the present disclosure and their equivalents, then the present disclosure is intended to cover these modifications and variations.

This application claims the benefit of priority from Chinese Patent Application No. 201410090141.7, filed on Mar. 12, 2014, which is hereby entirely incorporated by reference as a part of the present application.

What is claimed is:

1. An in-cell touch panel, comprising:
    an upper substrate and a lower substrate that are disposed opposite to each other, wherein a planarization layer and a spacer layer disposed on the planarization layer are provided at a side, facing the lower substrate, of the upper substrate;
    a liquid crystal layer disposed between the upper substrate and the lower substrate; and
    a plurality of self-capacitive electrodes, disposed in a same layer, insulated from each other and arranged between the planarization layer and the spacer layer, and a touch detection chip configured to judge a touch location by means of detecting a variation of a capacitance value of each self-capacitive electrode in a touch period,
    wherein the spacer layer includes a plurality of spacers that are discretely disposed inside the liquid crystal layer, and the self-capacitive electrodes are disposed on top of the spacers respectively,
    wherein the in-cell touch panel further comprises:
        a black matrix layer disposed between the upper substrate and the lower substrate, wherein an orthographic projection of a pattern of each of the self-capacitive electrodes on the lower substrate lies within a region of a pattern of the black matrix layer; and
        conductive wires corresponding to the self-capacitive electrodes in a one-to-one manner, and conduction nodes corresponding to the self-capacitive electrodes in a one-to-one manner, wherein an orthographic projection of each of the conductive wires on the lower substrate lies within the region of the pattern of the black matrix layer, and each of the conduction nodes is arranged in a region where a sealant of the in-cell touch panel is provided.

2. The in-cell touch panel claimed as claim 1, wherein the orthographic projection of the pattern of each of the self-capacitive electrodes on the lower substrate is of a mesh structure disposed within the region of the pattern of the black matrix layer.

3. The in-cell touch panel claimed as claim 1,
    wherein each of the self-capacitive electrodes is connected to a connection terminal of the touch detection chip through a leading wire situated in the region where the sealant is provided, after the each of the self-capacitive electrodes is connected to a conduction node through a conductive wire.

4. The in-cell touch panel claimed as claim 3, wherein the conductive wires and the self-capacitive electrodes are disposed in a same layer.

5. The in-cell touch panel claimed as claim 4, wherein the region where the sealant of the in-cell touch panel is provided comprises four sides, and the conduction nodes are distributed at all the four sides of the region where the sealant is provided.

6. The in-cell touch panel claimed as claim 5, wherein the conduction node, to which each of the self-capacitive electrodes corresponds, is distributed at a side, closest to the self-capacitive electrode, of the region where the sealant is provided.

7. The in-cell touch panel claimed as claim 3, wherein the conductive wires and the self-capacitive electrodes are disposed in different layers, the conductive wires are disposed between the upper substrate and the planarization layer, and the each of the self-capacitive electrodes is electrically connected to the conductive wire, to which the self-capacitive corresponds, through a via hole.

8. The in-cell touch panel claimed as claim 1, wherein opposite sides, which respectively belong to two adjacent ones of the self-capacitive electrodes, each comprise a zigzag line.

9. The in-cell touch panel claimed as claim 8, wherein the opposite sides, which respectively belong to the two adjacent ones of the self-capacitive electrodes and respectively comprise the zigzag line, each comprise a stepped structure, and two stepped structures of the opposite sides are uniform in shape and match with each other; or,
    the opposite sides, which respectively belong to the two adjacent ones of the self-capacitive electrodes and respectively comprise the zigzag line, each comprise a concave-convex structure, and two concave-convex structures of the opposite sides are uniform in shape and match with each other.

10. A display device, comprising an in-cell touch panel, wherein the in-cell touch panel comprises:
    an upper substrate and a lower substrate that are disposed opposite to each other, wherein a planarization layer and a spacer layer disposed on the planarization layer are provided at a side, facing the lower substrate, of the upper substrate;

a liquid crystal layer disposed between the upper substrate and the lower substrate; and a plurality of self-capacitive electrodes, disposed in a same layer, insulated from each other and arranged between the planarization layer and the spacer layer, and a touch detection chip configured to judge a touch location by means of detecting a variation of a capacitance value of each self-capacitive electrode in a touch period, wherein the spacer layer includes a plurality of spacers, that are discretely disposed inside the liquid crystal layer, and the self-capacitive electrodes are disposed on top of the spacers respectively, wherein the display device further comprises:

a black matrix layer disposed between the upper substrate and the lower substrate, wherein an orthographic projection of a pattern of each of the self-capacitive electrodes on the lower substrate lies within a region of a pattern of the black matrix layer; and conductive wires corresponding to the self-capacitive electrodes in a one-to-one manner, and conduction nodes corresponding to the self-capacitive electrodes in a one-to-one manner, wherein an orthographic projection of each of the conductive wires on the lower substrate lies within the region of the pattern of the black matrix layer, and each of the conduction nodes is arranged in a region where a sealant of the in-cell touch panel is provided.

11. The display device of claim 10, wherein the orthographic projection of the pattern of each of the self-capacitive electrodes on the lower substrate is of a mesh structure disposed within the region of the pattern of the black matrix layer.

12. The display device of claim 10, wherein each of the self-capacitive electrodes is connected to a connection terminal of the touch detection chip through a leading wire situated in the region where the sealant is provided, after the each of the self-capacitive electrodes is connected to a conduction node through a conductive wire.

13. The display device of claim 10, wherein the conductive wires and the self-capacitive electrodes are disposed in different layers, the conductive wires are disposed between the upper substrate and the planarization layer, and the each of the self-capacitive electrodes is electrically connected to the conductive wire, to which the self-capacitive corresponds, through a via hole.

* * * * *